Oct. 31, 1961 — E. GRUENDLER — 3,006,594
LINKAGE SEAT ADJUSTER WITH STRAIGHT LINE MOVEMENT
Filed Nov. 12, 1958 — 2 Sheets-Sheet 1
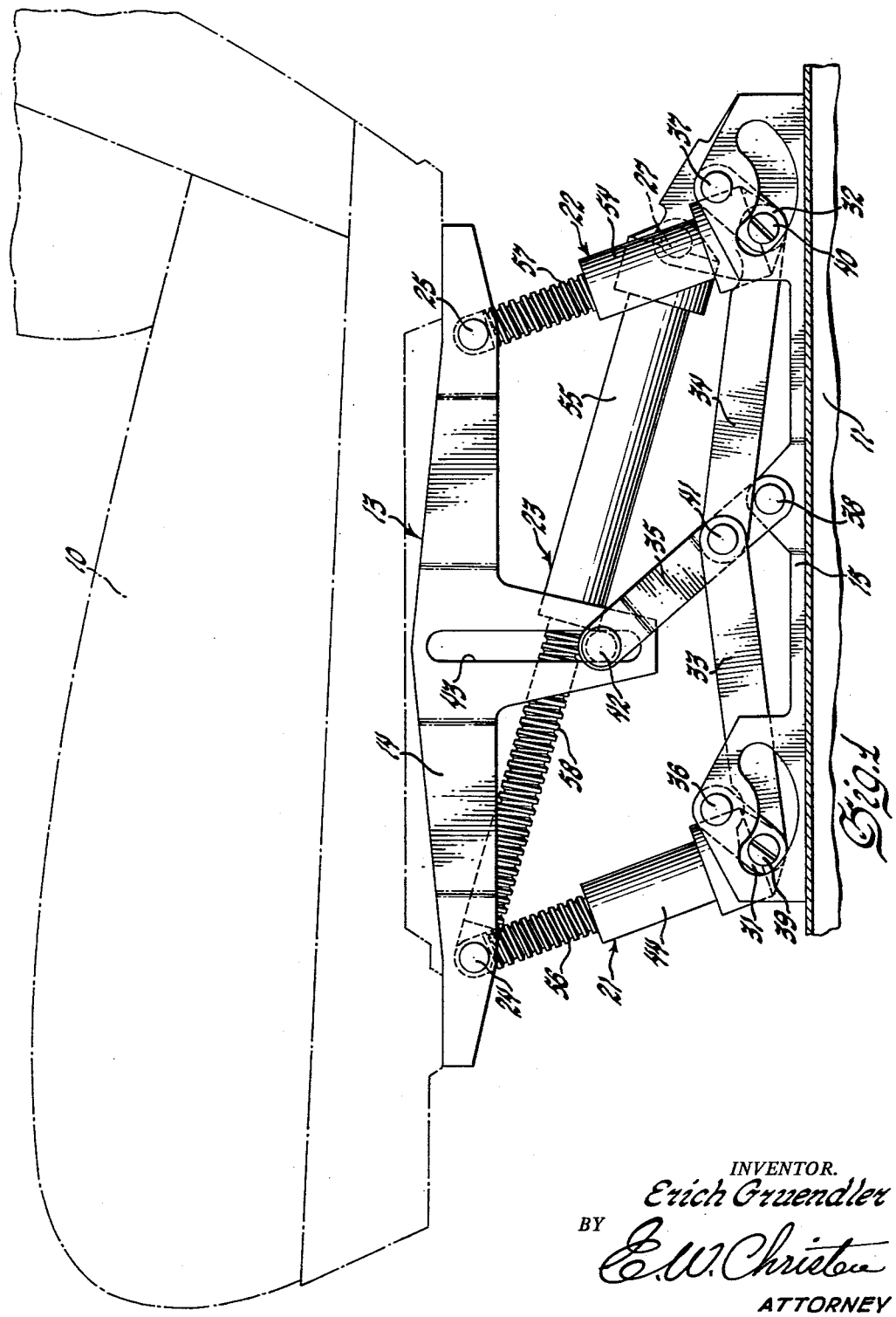
INVENTOR.
Erich Gruendler
BY
E.W. Christen
ATTORNEY

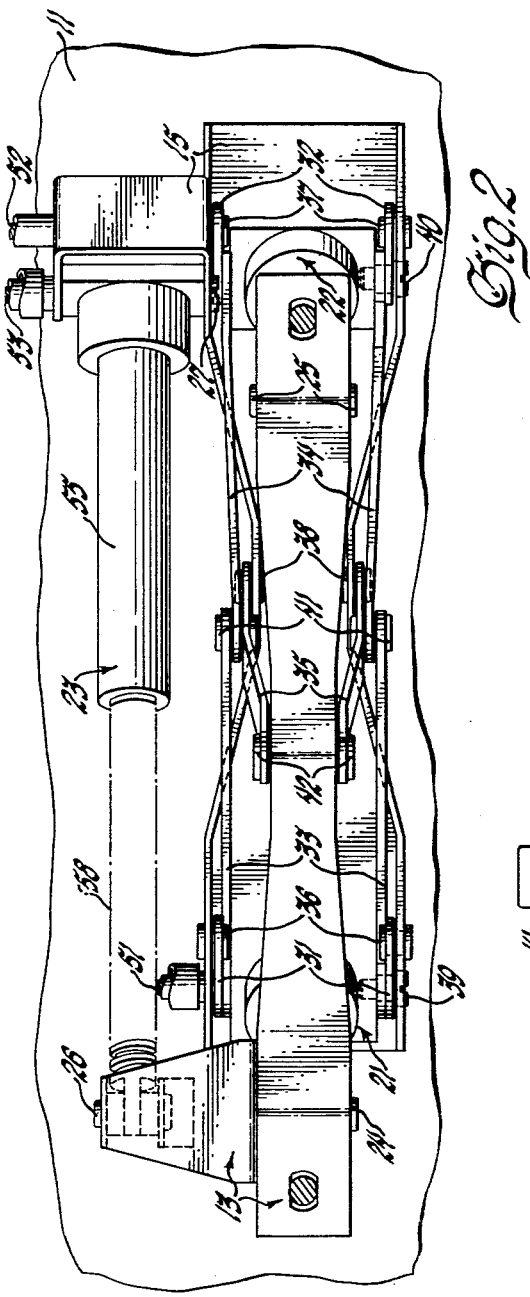

United States Patent Office 3,006,594
Patented Oct. 31, 1961

3,006,594
LINKAGE SEAT ADJUSTER WITH STRAIGHT LINE MOVEMENT
Erich Gruendler, Detroit, Mich., assignor to General Motors Corporation, Detroit, Mich., a corporation of Delaware
Filed Nov. 12, 1958, Ser. No. 773,210
17 Claims. (Cl. 248—424)

This invention relates to vehicle seat adjusters and more particularly to a linkage type seat adjuster that provides substantially straight line movement.

Seat adjusters which employ swinging links for adjustment purposes are well known but they commonly suffer from the fact that the swinging linkage causes the seat to follow a curved adjustment path. The subject seat adjuster employs a novel linkage which provides a substantially straight adjustment path. In addition, the subject linkage is so arranged as to permit selective adjustments in horizontal, vertical and tilt directions. Conventional seat adjusters which provide such six-way action commonly employ tracks for the horizontal adjustments and front and rear swinging links for the vertical and tilt adjustments. The subject seat adjuster dispenses with the tracks and yet obtains substantially straight line horizontal adjustment.

In the drawings:

FIGURE 1 is a side elevation of a left-hand seat adjuster;

FIGURE 2 is a plan view of the left-hand seat adjuster; and

FIGURE 3 is a front view of the left-hand seat adjuster.

Referring to the drawings, a seat 10 is supported on a floor 11 by a left-hand seat adjuster 13 and by a similar right-hand seat adjuster, not shown. The adjuster 13 has an upper frame 14 secured to the underside of the seat and a lower frame 15 secured to the floor. Three longitudinally extensible screw jacks 21, 22 and 23 have their upper ends connected to the upper frame 14 by pivots 24, 25 and 26 and to the lower frame 15 by two links and a pivot 27. The jacks and frames constitute parts of a linkage system which provides selective adjustments of the seat in horizontal, vertical and tilt directions. Five links 31, 32, 33, 34 and 35 complete the linkage system. As shown in FIGURES 2 and 3, each of the five links is a double one for strength purposes.

The links 31, 32 and 35 are connected to the lower frame 15 by pivots 36, 37 and 38. The link 31 also has a common connection with the jack 21 and the link 33 through a pivot 39. Similarly, the link 32 has a common connection with the jack 22 and the link 34 through a pivot 40. The links 33 and 34 have a common connection to the link 35 through a pivot 41. A pivot 42 is vertically slidable in a slot 43 in the upper frame 14 to provide the link 35 with an upper frame connection.

The jacks 21, 22 and 23 are conventional so are not described in great detail. The jack 21 has a drive housing 44 which is powered by a flexible shaft 51 that is driven by a reversible electric motor, not shown, under the control of the driver. Two other reversible electric motors each under the control of the driver drive flexible shafts 52 and 53 of drive housings 54 and 55 of the jacks 22 and 23. The similar screw jacks of the right-hand seat adjuster are also driven by the respective motors to coordinate the adjustments at both sides of the seat.

When the shaft 51 is rotated, a threaded driven member, not shown, in the housing 44 extends or retracts a screw shaft 56 longitudinally so the jack 21 will raise or lower the front portion of the seat 10. In a similar manner, when the shaft 52 is rotated, a screw shaft 57 of the jack 22 is extended or retracted to raise or lower the rear portion of the seat. The shafts 51 and 52 can be driven separately or in unison to provide the seat with the adjustments in vertical and tilt directions.

The shaft 53 extends or retracts a screw shaft 58 of the jack 23 to move the seat in fore and aft direction. As previously noted, such horizontal adjustment follows a substantially straight path and this is occasioned by causing the lower ends of the jacks 21 and 22 to swing along a fixed path when the jack 23 is operated as a result of the links 31 through 35 being shifted by the fore and aft movement of the upper frame 14.

In FIGURE 1, the seat is shown in its full forward and up position. When the jack 23 is retracted, the seat shifts rearwardly along a path determined by the swinging movement of the jacks 21 and 22. If the pivot supports 39 and 40 of these jacks were fixed, it is obvious that the seat would raise and then fall during the rearward movement. This does not occur in any substantial degree, however, for as the seat is shifted rearwardly, the pivots 39 and 40 are first lowered and then raised by means of the links 31 through 35 to provide the seat with a substantial straight path of horizontal movement. In moving to the rear, the upper frame 14 rotates the link 35 clockwise by means of the slidable pivot connection 42 and 43. The link 35, in turn, swings the links 31 and 32 in a counterclockwise direction by means of the interconnecting links 33 and 34. As the links 31 and 32 swing counterclockwise, the lower ends of the jacks 21 and 22 are lowered and raised in accordance with the arcuate path of the pivots 39 and 40 about the pivots 36 and 37. The arcuate path of the pivots 24 and 25 about the pivots 39 and 40 is accordingly less pronounced than would be the case if the pivots 39 and 40 were fixed and the path, in fact, approaches straight line motion.

While the embodiment of the invention here described is preferred, it is understood that modifications may be made by the exercise of skill in the art which will lie within the scope of the invention.

I claim:

1. A seat adjuster comprising a pair of frames, a first pair of pivotally connected links having one link pivoted to one frame and the other link pivoted to the other frame, a second pair of pivotally connected links having one link pivoted to the one frame and the other link pivoted to the other frame, means for moving the one frame, and other separate means directly interconnecting each of the frames with each of the linkage pairs to guide the movement of the one frame along a substantially straight path.

2. A seat adjuster comprising a pair of frames, a first pair of pivotally connected links having one link pivoted to one frame and the other link pivoted to the other frame, a second pair of pivotally connected links having one link pivoted to the one frame and the other link pivoted to the other frame, means for moving the one frame, and other separate linkage directly interconnecting each of the frames with each of the linkage pairs to guide the movement of the one frame along a substantially straight path.

3. A seat adjuster comprising a pair of frames, a first pair of pivotally connected links including a longitudinally extensible link, one link being pivoted to one frame and the extensible other link being pivoted to the other frame, a second pair of pivotally connected links including a longitudinally extensible link, one link being pivoted to the one frame and the extensible other link being pivoted to the other frame, a third longitudinally extensible link pivotally connected to each frame, means for selectively extending each of the extensible links whereby the extensible links of the linkage pairs provide vertical and tilt adjustments of the one frame with respect to the other frame and the third extensible link provides horizontal adjustments, and other linkage interconnecting the frames and the linkage pairs to guide the movement of the one frame along a substantially straight path during the horizontal adjustments.

4. A seat adjuster according to claim 3 wherein the extensible links are screw jacks and wherein the one frame is a lower frame and the other frame is an upper frame.

5. A seat adjuster comprising a pair of frames, a pair of longitudinally extensible jacks each having one end directly pivoted to one frame, means for moving the one frame relative the other, means for supporting the other end of each jack on the other frame for movement along a fixed path, and linkage means for directly interconnecting the other end of each jack with the one frame.

6. A seat adjuster comprising a pair of frames, a pair of longitudinally extensible jacks each having one end directly pivoted to one frame, means for supporting the other end of each jack on the other frame for movement along a fixed path, means for moving the one frame relative the other with the other ends of the jacks serving as pivot supports, and linkage means for directly interconnecting the other ends of the jacks with the one frame so that the pivot supports move along the fixed path with relative movement between the frames and thereby provide substantially parallel relative movement between the frames.

7. A seat adjuster according to claim 6 wherein a third longitudinally extensible jack interconnects the frames to comprise the means for moving the one frame relative the other.

8. A seat adjuster according to claim 7 wherein the one frame is an upper frame and the other frame is a lower frame.

9. A seat adjuster according to claim 8 wherein each of the extensible jacks is a selectively operable screw jack to provide selective vertical, tilt and horizontal adjustments of the upper frame with respect to the lower frame.

10. A seat adjuster comprising upper and lower frames, first, second and third longitudinally extensible jacks, and first, second, third, fourth and fifth links interconnecting the frames and jacks whereby the jacks provide selective adjustments of the upper frame to the lower frame in horizontal, vertical and tilt directions, the first, second and fifth links each having a pivot connection to one frame, the first, second and third jacks each having a pivot connection to the other frame, the first link having a common pivot connection to the first jack and third link, the second link having a common pivot connection to the second jack and fourth link, the fifth link having a slidable pivot connection to the other frame, the third and fourth links having a common pivot connection to the fifth link, and the third jack having a pivot connection to the one frame.

11. A seat adjuster according to claim 10 wherein the jacks are screw jacks and wherein the one frame is the lower frame.

12. A seat adjuster comprising upper and lower frames, first, second and third longitudinally extensible jacks, and first, second, third, fourth and fifth links interconnecting the frames and jacks whereby the jacks provide selective adjustments of the upper frame to the lower frame in horizontal, vertical and tilt directions, the first, second and fifth links each having a pivot connection to one frame, the first, second and third jacks each having a pivot connection to the other frame, the first link having a pivot connecion to the first jack, the second link having a pivot connection to the second jack, the fifth link having a slidable pivot connection to the other frame, the third link having a pivot connection to the first link and a pivot connection to the fifth link, the fourth link having a pivot connection to the second link and a pivot connection to the fifth link, and the third jack having a pivot connection to the one frame.

13. A seat adjuster comprising upper and lower frames, first, second and third longitudinally extensible screw jacks, and first, second, third, fourth and fifth links interconnecting the frames and jacks whereby the jacks provide selective adjustments of the upper frame to the lower frame in horizontal, vertical and tilt directions, the first, second and fifth links each having a pivot connection to the lower frame, the first, second and third jacks each having a pivot connection to the upper frame, the first link having a pivot connection to the first jack, the second link having a pivot connection to the second jack, the fifth link having a slidable pivot connection to, the upper frame, the third link having a pivot connection to the first link and a pivot connection to the fifth link, the fourth link having a pivot connection to the second link and a pivot connection to the fifth link, and the third jack having a pivot connection to the lower frame.

14. A seat adjuster comprising upper and lower frames, first, second and third longitudinally extensible jacks, and first, second, third, fourth and fifth links interconnecting the frames and jacks whereby the jacks provide selective adjustments of the upper frame to the lower frame in horizontal, vertical and tilt directions, the first, second and fifth links each having a pivot connection to one frame, the first, second and third jacks each having a pivot connection to the other frame, the first link having a pivot connection to the first jack, the second link having a pivot connection to the second jack, the fifth link having a slidable pivot connection to the other frame, the third link having a pivot connection to the first jack and a pivot connection to the fifth link, the fourth link having a pivot connection to the second jack and a pivot connection to the fifth link, and the third jack having a pivot connection to the one frame.

15. A seat adjuster comprising upper and lower frames, first, second and third longitudinally extensible screw jacks, and first, second, third, fourth and fifth links interconnecting the frames and jacks whereby the jacks provide selective adjustments of the upper frame to the lower frame in horizontal, vertical and tilt directions, the first, second and fifth links each having a pivot connection to the lower frame, the first, second and third jacks each having a pivot connection to the upper frame, the first link having a pivot connection to the first jack, the second link having a pivot connection to the second jack, the fifth link having a slidable pivot connection to the upper frame, the third link having a pivot connection to the first jack and a pivot connection to the fifth link, the fourth link having a pivot connection to the second jack and a pivot connection to the fifth link, and the third jack having a pivot connection to the lower frame.

16. A seat adjuster as defined in claim 1 and wherein said other separate means comprises a control link fixably pivoted to one frame and movably pivoted to the other frame, and connecting links pivoted to said control link and each pair of said pivotally connected links to control movement thereof and guide the movement of the one frame along a substantially straight path.

17. A seat adjuster as defined in claim 1 and having arcuate guideways provided in one of said frames adjacent each pair of said pivotally connected links, and guide means fixably secured to each pair of said pivotally connected links and extending within said guideway to control movement of each pair of said pivotally connected links.

References Cited in the file of this patent

UNITED STATES PATENTS

| | | |
|---|---|---|
| 2,256,004 | Thomas | Sept. 16, 1941 |
| 2,260,032 | Kaiser | Oct. 21, 1941 |
| 2,707,137 | Hollstein | Apr. 26, 1955 |
| 2,809,689 | Garvey et al. | Oct. 15, 1957 |